(12) United States Patent
Han

(10) Patent No.: US 6,616,249 B2
(45) Date of Patent: Sep. 9, 2003

(54) DEVICE FOR MOUNTING COIL ASSEMBLIES OF SOLENOID VALVES IN ELECTRONICALLY CONTROLLED BRAKE SYSTEMS

(75) Inventor: Gak-Hyun Han, Pyungtak (KR)

(73) Assignee: Mando Corporation, Pyungtak (KR)

( * ) Notice: Subject to any disclaimer, the term of this patent is extended or adjusted under 35 U.S.C. 154(b) by 0 days.

(21) Appl. No.: 10/098,921

(22) Filed: Mar. 15, 2002

(65) Prior Publication Data

US 2003/0042789 A1 Mar. 6, 2003

(30) Foreign Application Priority Data

Sep. 3, 2001 (KR) .......................... 2001-53776

(51) Int. Cl.[7] .................................. B60T 8/36
(52) U.S. Cl. ................. 303/119.3; 303/119.2; 336/208; 251/129.15
(58) Field of Search .................. 303/119.3, 119.2; 137/884, 596.17; 336/192, 199, 221, 105, 185, 208, 210, 83; 335/210, 220, 278, 255, 282, 260, 299, 250; 29/602.1, 606, 882; 251/129.15; 439/34, 76.1, 78

(56) References Cited

U.S. PATENT DOCUMENTS

| | | | | |
|---|---|---|---|---|
| 5,449,227 A | * | 9/1995 | Steinberg et al. | 303/119.2 |
| 5,755,494 A | * | 5/1998 | Sekiguchi | 303/119.2 |
| 5,766,026 A | * | 6/1998 | Cooper et al. | |
| 5,774,036 A | * | 6/1998 | Hrytzak et al. | 336/208 |
| 5,823,507 A | * | 10/1998 | Inden et al. | 251/129.15 |
| 5,845,672 A | * | 12/1998 | Reuter et al. | |
| 6,000,679 A | * | 12/1999 | Reuter et al. | 251/129.15 |
| 6,120,114 A | * | 9/2000 | Blazic et al. | 303/119.3 |
| 6,293,634 B1 | | 9/2001 | Hosoya | |
| 6,336,818 B1 | * | 1/2002 | Bayer | |
| 6,352,317 B1 | * | 3/2002 | Blazic et al. | 303/119.3 |
| 6,412,754 B1 | * | 7/2002 | Ogino et al. | 303/119.3 |
| 6,498,558 B1 | * | 12/2002 | Linkner, Jr. et al. | |

* cited by examiner

Primary Examiner—Douglas C. Butler
(74) Attorney, Agent, or Firm—Ladas & Parry

(57) ABSTRACT

A device for mounting the coil assemblies of solenoid valves in the ECU's housing of an electronically controlled brake system for automobiles is disclosed. When mounting a coil assembly in the ECU's housing using the mounting device of this invention, the coil assembly is received in a cylindrical holder formed at the bottom wall of the ECU's housing. In such a case, two bosses formed on the bobbin of the coil assembly pass through two holes formed at the bottom wall of the ECU's housing, and one of the two bosses is plastically deformed at its lower end projecting outside an associated hole, thus forming a stopper preventing an undesired removal of the coil assembly from the housing. Due to the mounting device of this invention, it is possible to improve work efficiency while mounting the coil assemblies of solenoid valves in the ECU's housing, and so the production cost of the brake systems is reduced.

5 Claims, 6 Drawing Sheets

DEVICE FOR MOUNTING COIL ASSEMBLIES OF SOLENOID VALVES IN ELECTRONICALLY CONTROLLED BRAKE SYSTEMS

BACKGROUND OF THE INVENTION

1. Field of the Invention

The present invention relates, in general, to solenoid valves of electronically controlled brake systems for automobiles and, more particularly, to a device for stably and securely mounting the coil assemblies of such solenoid valves in the electronic control unit's housing of such a brake system.

2. Description of the Prior Art

In the prior art, several types of electronically controlled brake systems for automobiles have been proposed and used. Examples of such electronically controlled brake systems are an anti-lock brake system (ABS), a brake traction control system (BTCS), and a vehicle dynamic control system (VDCS). The ABS electronically controls oil pressure fed to wheel brakes and prevents slippage of wheels during a braking operation. The BTCS is designed to appropriately lock the drive wheels at high speeds or during sudden acceleration, thus preventing slippage of the drive wheels. The VDCS is fabricated by a combination of the ABS and BTCS, and controls braking oil pressure to secure traveling stability while driving an automobile.

A conventional electronically controlled brake system consists of a plurality of solenoid valves, which control a flow of pressurized oil fed to the hydraulic brakes provided at the wheels. The brake system also has a low-pressure accumulator, which temporarily stores pressurized oil drained from the brakes during a braking operation in a pressure reducing mode. An oil pump forcibly sucks the pressurized oil from the low-pressure accumulator, and outputs the oil. A high-pressure accumulator is arranged at the outlet of the oil pump, and reduces pressure pulsation of oil outputted from the pump. The brake system also includes an electronic control unit (ECU), which controls the operation of the pump and solenoid valves.

In the conventional electronically controlled brake system, the valve assemblies of the solenoid valves, oil pump, low- and high-pressure accumulators are compactly set in a modulator block made of aluminum. The ECU is fabricated by setting the solenoid valve's coil assemblies and a circuit board in a housing. This ECU is integrated with the modulator block into a single body using mounting bolts. FIG. 1 shows a conventional structure for mounting the solenoid valves of an electronically controlled brake system.

In a conventional electronically controlled brake system, the valve assemblies 2a of the solenoid valves 2 are compactly set in a modulator block 1, while the coil assemblies 2b of the solenoid valves 2 are securely set in an ECU 3.

The ECU 3 consists of a housing 3a, which is a rectangularly walled body made of a plastic material through a plastic injection molding process. This housing 3a is mounted to the modulator block 1 using a plurality of mounting bolts 3c. A circuit board 3b is set in a space independently defined in the lower portion of the housing 3a. The coil assemblies 2b of the solenoid valves 2 are set in the main cavity of the housing 3a. Each of the coil assemblies 2b consists of a cylindrically coiled coil 2c, and two lead wires 2d electrically connecting the coil 2c to the circuit board 3b. When the ECU 3 is assembled with the modulator block 1 into a single body, the projecting ends or the sleeves of the valve assemblies 2a are smoothly inserted into the central bores of the coil assemblies 2b, respectively, with a clearance formed between the sleeves and the bores. When a current is applied to the coil assemblies 2b of the solenoid valves 2 after assembling the ECU 3 with the modulator block 1 into a single body, electric fields are formed at the coil assemblies 2b and selectively open or close the valve assemblies 2a of the solenoid valves 2.

In the conventional structure, the coil assemblies 2b of the solenoid valves 2 are fixed at their lower ends in the housing 3a of the ECU 3 by a coil mounting member 4, which is produced through an over-molding of rubber. That is, the coil assemblies 2b are securely fixed at their lower portions to the bottom of the ECU's housing 3a while being molded with a "molder" which is a kind of rubber. The valve assemblies 2a of the solenoid valves 2, which are set in the modulator block 1, are inserted into the central bores of the coil assemblies 2b.

However, the conventional structure for mounting the solenoid valve's coil assemblies 2b in the ECU's housing 3a is problematic in that the mounting of the coil assemblies 2b in the housing 3a is accomplished by the coil mounting member 4 made of rubber. Therefore, it is difficult to mount the coil assemblies 2b in the housing 3a, in addition to lengthening the processing time while mounting the assemblies 2b. In addition, a facility for injecting the molder to form the coil mounting member 4 must be added to the assembling line of ECUs 3, thus forcing the manufacturer of electronically controlled brake systems to pay excessive money for installing the facility. This increases the production cost of such brake systems.

SUMMARY OF THE INVENTION

Accordingly, the present invention has been made keeping in mind the above problems occurring in the prior art, and an object of the present invention is to provide a coil assembly mounting device, which has an improved structure capable of more easily mounting the coil assemblies of solenoid valves in an ECU's housing of an electronically controlled brake system for automobiles, and which reduces the production cost of such brake systems.

In order to accomplish the above objects, the present invention provides in a solenoid valve for electronically controlled brake systems, comprising a valve assembly having an armature movably set in a sleeve; a coil assembly set in a housing of an electronic control unit of a brake system and having a bobbin axially receiving the sleeve of the valve assembly, with a coil wound around the bobbin; a lead wire inserted in the bobbin and connected to a circuit board set in the housing of the electronic control unit; and a device for mounting the coil assembly in the housing of the electronic control unit, the device comprising: a through hole formed in the bottom wall of the housing of the electronic control unit; and a boss axially extending downward from the bottom of the bobbin at a position around the edge of the bobbin, and inserted into the through hole to be set in the hole.

In the device, the boss passes through the through hole to be exposed outside the hole at an end thereof, and plastically deformed at the exposed end to form a stopper preventing an undesired removal of the coil assembly from the bottom wall of the housing.

The lower end of the through hole is gradually enlarged in its diameter in a direction from the top to the bottom, thus forming a flared end allowing the stopper to be easily formed.

In the device, a cylindrical holder is formed in the housing, and receives the coil assembly therein, with the through hole formed on the bottom wall of the cylindrical holder.

The device further comprises: an additional boss axially extending downward from the bottom of the bobbin at a position around the edge of the bobbin, with the lead wire inserted into the additional boss; and a mounting hole formed on the bottom wall of the cylindrical holder, and receiving the additional boss therein.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
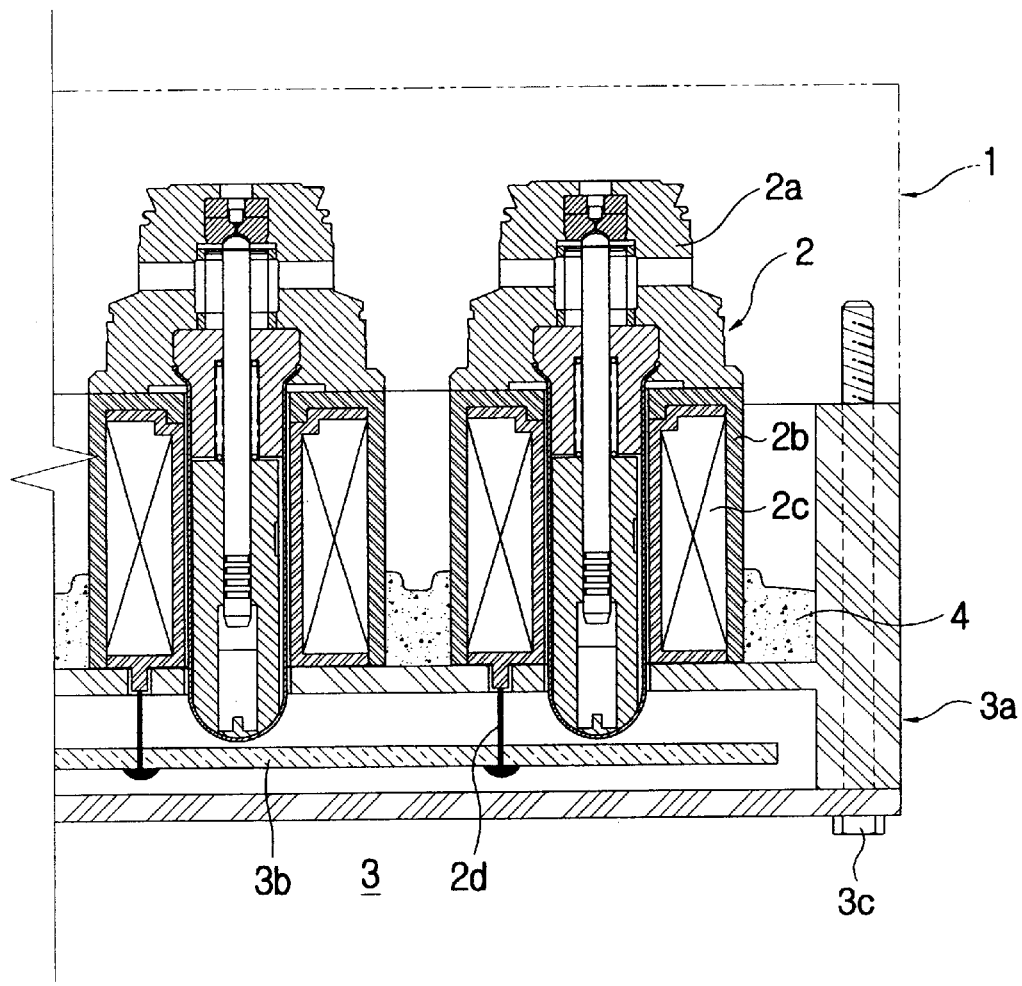
FIG. 1 is a sectional view of a conventional structure for mounting the solenoid valves of an electronically controlled brake system.

Reference now should be made to the drawings, in which the same reference numerals are used throughout the different drawings to designate the same or similar components.

Figure 2:
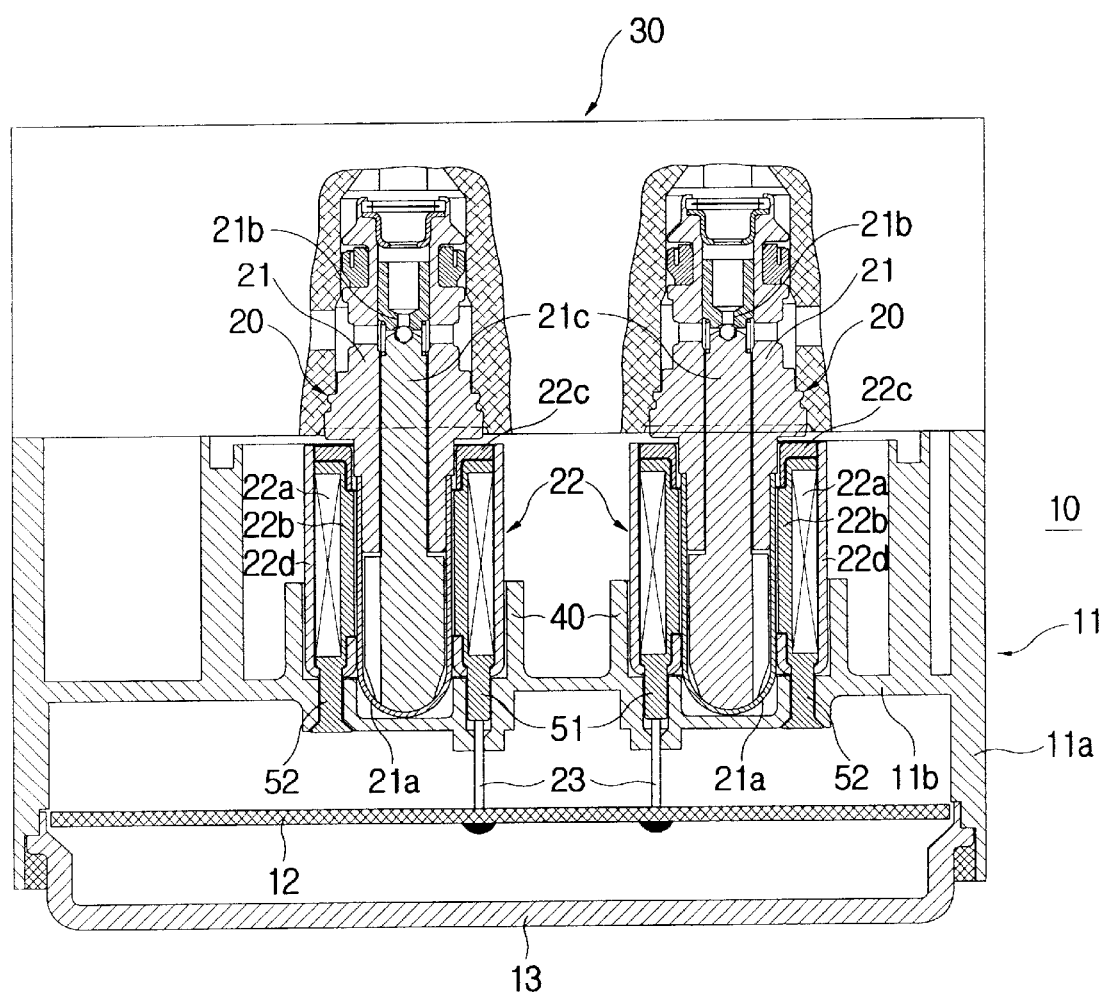
FIG. 2 is a sectional view of an ECU of an electronically controlled brake system, provided with the device for mounting the solenoid valve's coil assemblies in the ECU in accordance with the preferred embodiment of the present invention.

As shown in FIG. 2, the electronic control unit (ECU) 10 of an electronically controlled brake system of this invention consists of a housing 11, which is a box-shaped body provided with sidewalls 11a and a bottom wall 11b. The bottom wall 11b is intermediately positioned in the housing 11 to divide the interior of the housing 11 into upper and lower spaces respectively opened upward and downward. A circuit board 12 is set in the lower space formed in the housing 11 at a position under the bottom wall 11b. Two lead wires 23 extending from the coil assembly 22 of each solenoid valve 20 are connected to the circuit board 12 prior to covering the lower space of the housing 11 with a lower cover 13. The ECU 10 having the above-mentioned construction controls the operation of the brake system.

A modulator block 30 is mounted to the top of the ECU's housing 11 using a plurality of mounting bolts (not shown). This modulator block 30 compactly seats a plurality of NO(normal open)-type and NC(normal close)-type solenoid valves 20, an oil pump (not shown), a low-pressure accumulator (not shown), and a high-pressure accumulator (not shown) therein.

Each of the solenoid valves 20 consists of a valve assembly 21, which has a sleeve 21a with an armature 21c movably set in the sleeve 21a to selectively open or close an orifice 21b. Each solenoid valve 20 also has a coil assembly 22, which smoothly receives the sleeve 21a of the valve assembly 21 therein with a clearance formed between the sleeve 21a and the coil assembly 22, and operates the armature 21c by an electromagnetic force generated when a current is applied to the coil assembly 22.

The valve assemblies 21 of the solenoid valves 20 are set in the modulator block 30, while the coil assemblies 22 of the solenoid valves 20 are set uprightly on the bottom wall 11b of the housing 11, and connected to the circuit board 12 through the lead wires 23 as will be described later herein.

Figure 3:
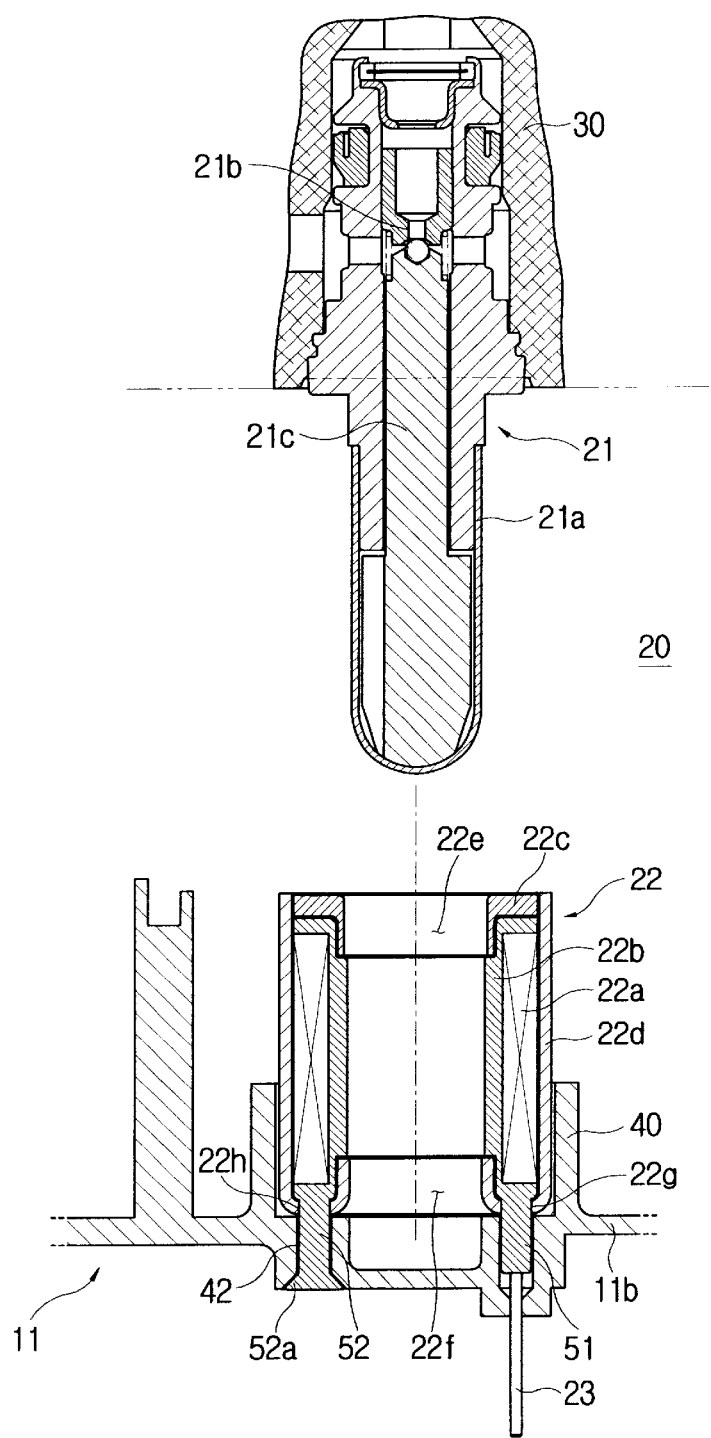
FIGS. 3 and 4 are an exploded sectional view, and a partially sectioned, exploded perspective view of a solenoid valve mounted in the ECU using the mounting device of this invention.
Figure 4:
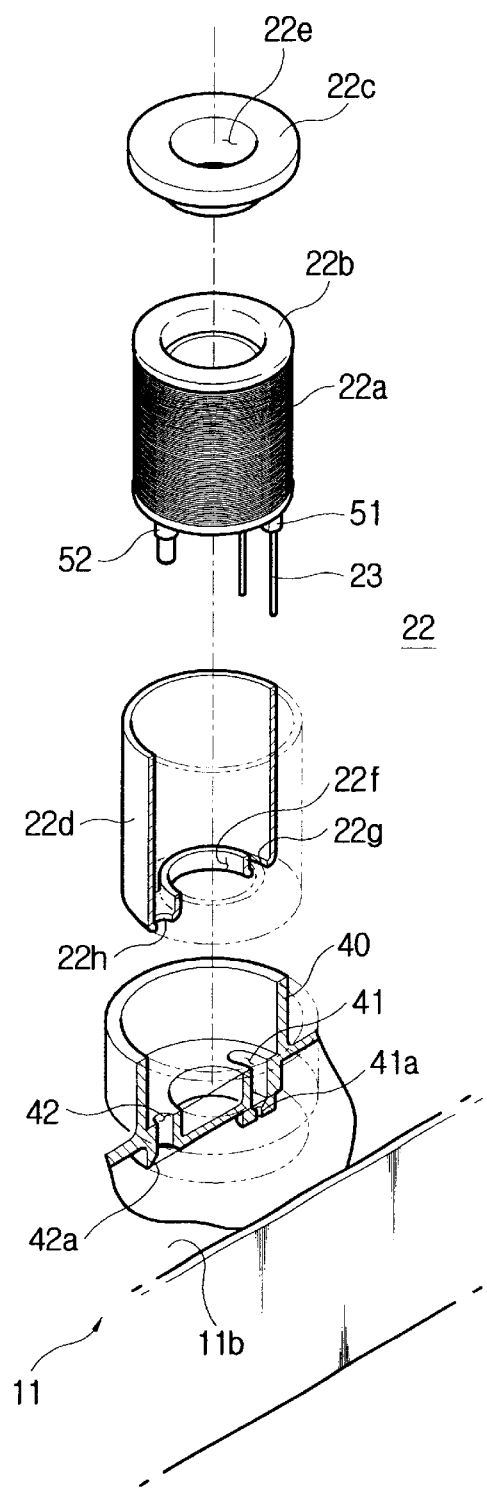

In order to mount the coil assemblies 22 of the solenoid valves 20 on the bottom wall 11b of the housing 11, the bottom wall 11b of the housing 11 has a plurality of cylindrical holders 40. In addition, a coil assembly mounting device is provided in the housing 11 for securely holding the coil assemblies 22 received in the cylindrical holders 40. Such a structure for mounting the coil assemblies 22 of the solenoid valves 20 on the bottom wall 11b of the housing 11 is described in detail as follows with reference to FIGS. 3 and 4.

The coil assembly 22 of each solenoid valve 20 consists of a cylindrical bobbin 22b with a coil 22a wound on the bobbin 22b. Two lead wires 23 are inserted into and fixed to the lower end of the bobbin 22b, and connected to the end of the coil 22a so as to supply a current to the coil 22a. The coil assembly 22 also has a casing, which consists of upper and lower casing parts 22c and 22d, and covers the bobbin 22b.

The bobbin 22b of each coil assembly 22 is made of a plastic material through a plastic injection molding process. Two lead wires 23 are axially inserted into and fixed to the lower end of the bobbin 22b during the process of producing the bobbin 22b.

The casing covers the bobbin 22b, and consists of the lower casing part 22d which has a cylindrical shape open at its top end, and the upper casing part 22c which closes the open top end of the lower casing part 22d after the bobbin 22b is received in the lower casing part 22d. A central opening 22e, 22f is formed at the center of each of the upper casing part 22c and the bottom wall of the lower casing part 22d. The sleeve 21a of a valve assembly 21 is thus inserted into the coil assembly 22 through the two central openings 22e and 22f of the casing parts 22c and 22d. Two through holes 22g and 22h are formed on the bottom wall of the lower casing part 22d at diametrically opposite positions, and receive first and second bosses 51 and 52 of the coil assembly mounting device therein, respectively.

Each of the cylindrical holders 40 is formed on the bottom wall 11b of the ECU's housing 11 such that the upper part of the holder 40 projects upward from the bottom wall 11b and is open at its top end. The lower portions of the coil assemblies 22 are received in the holders 40 with a clearance formed between the assemblies 22 and holders 40, and so the coil assemblies 22 are preliminarily set in the housing 11.

The coil assembly mounting device of this invention is provided in the housing 11 for securely holding the coil assemblies 22 received in the cylindrical holders 40. This mounting device consists of first and second bosses 51 and 52, which are provided on the lower portion of the bobbin 22b at diametrically opposite positions. The mounting device also has a mounting hole 41 and a through hole 42, which are formed at the bottom wall of each cylindrical holder 40 at diametrically opposite positions and receive the first and second bosses 51 and 52, respectively.

The first boss 51 is an oval rod, which axially extends downward from the bottom wall of the bobbin 22b to a predetermined length at a position around the bottom wall's edge, and has an oval-shaped cross-section. Two lead wires 23 are axially and parallely inserted into the first boss 51.

The second boss 52 is a cylindrical rod, which axially extends downward from the bottom wall of the bobbin 22b to a predetermined length at a position diametrically opposite to the first boss 51 and has a circular cross-section. The two axial bosses 51 and 52 are axially formed on the bobbin 22b during the plastic injection molding process of producing the bobbin 22b. The two lead wires 23 axially inserted in the first boss 51 are used for electrically connecting the coil assembly 22 to the circuit board 12. The length of the second boss 52 is designed such that the boss 52 completely passes through the through hole 42 of the holder 40. When mounting the coil assembly 22 to the housing 11, the lower end of the second boss 52 projecting from lower end of the hole 42 is plastically deformed to hold the assembly 22 in the holder 40, thus preventing an undesired removal of the assembly 22 from the holder 40.

The mounting hole 41, formed on the bottom wall of the cylindrical holder 40, has a cross-section corresponding to the oval cross-section of the first boss 51. The lower end of the mounting hole 41 is reduced in its diameter to form a small-diameter end 41a, which allows only the lead wires 23 to pass through it. The through hole 42 has a cross-section corresponding to the circular cross-section of the second boss 52. The lower end of the through hole 42 is gradually enlarged in its diameter in a direction from the top to the bottom, thus forming a flared end 42a. Since the through hole 42 has such a flared end 42a at its lower end, it is possible to easily form a countersunk stopper 52a, which is formed at the lower end of the second boss 52 by plastically deforming said end at the outside of the hole 42 and seated in the flared end 42a.

The process of mounting the solenoid valves 20 in the ECU's housing 11 using the coil assembly mounting device of this invention will be described herein below, along with the operational effect of the mounting device.

First, the bobbin 22b wound with the coil 22a is inserted into the lower casing part 22d, and covered with the upper casing part 22c at the open top of the lower casing part 22d, thus assembling the coil assembly 22 of a solenoid valve 20 in which the first and second bosses 51 and 52 completely pass through the two through holes 22g and 22h of the casing part 22d to project outside the holes 22g and 22h.

Figure 5:
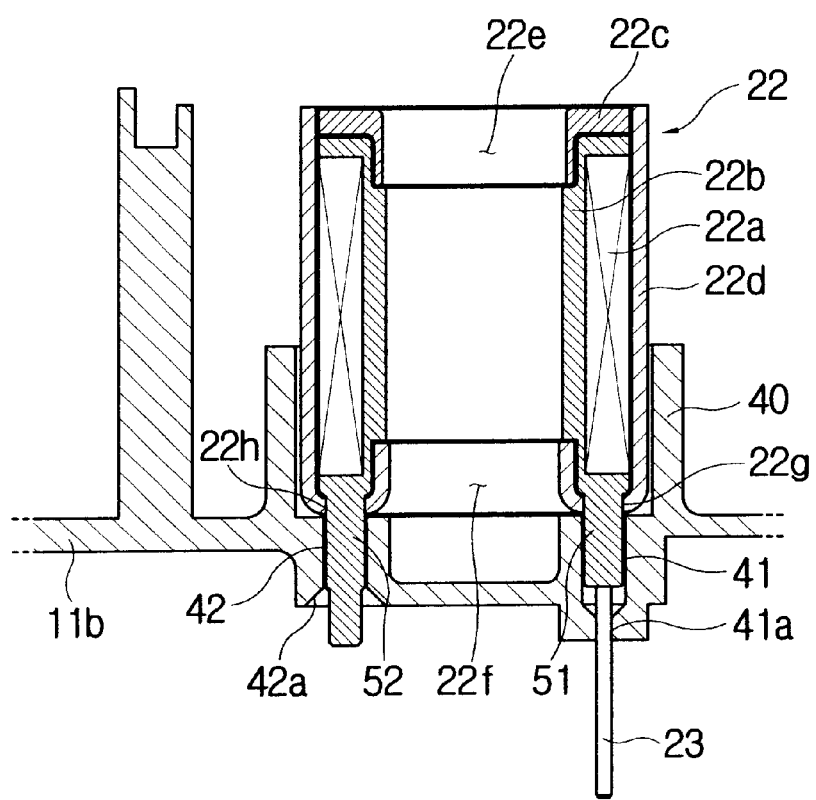
FIGS. 5 and 6 are sectional views showing the process of mounting a solenoid valve in the ECU using the mounting device of this invention.

The coil assembly 22 of the solenoid valve 20 is, thereafter, inserted into a cylindrical holder 40 of the housing 11, thus being preliminarily set in the housing 11. In such a case, the first boss 51 of the coil assembly 22 is inserted into the mounting hole 41 of the holder 40, while the second boss 52 is inserted into the through hole 42 as shown in FIG. 5.

When the coil assembly 22 of the solenoid valve 20 is preliminarily set in the cylindrical holder 40 of the housing 11 as described above, the lead wires 23 inserted in and fixed to the first boss 51 of the assembly 22 pass through the small-diameter end 41a of the mounting hole 41 to extend into the lower space of the housing 11, thus being connected to the circuit board 12 set in said space. The lower end of the second boss 52 of the assembly 22 passes through the through hole 42 to extend into the lower space of the housing 11.

Figure 6:
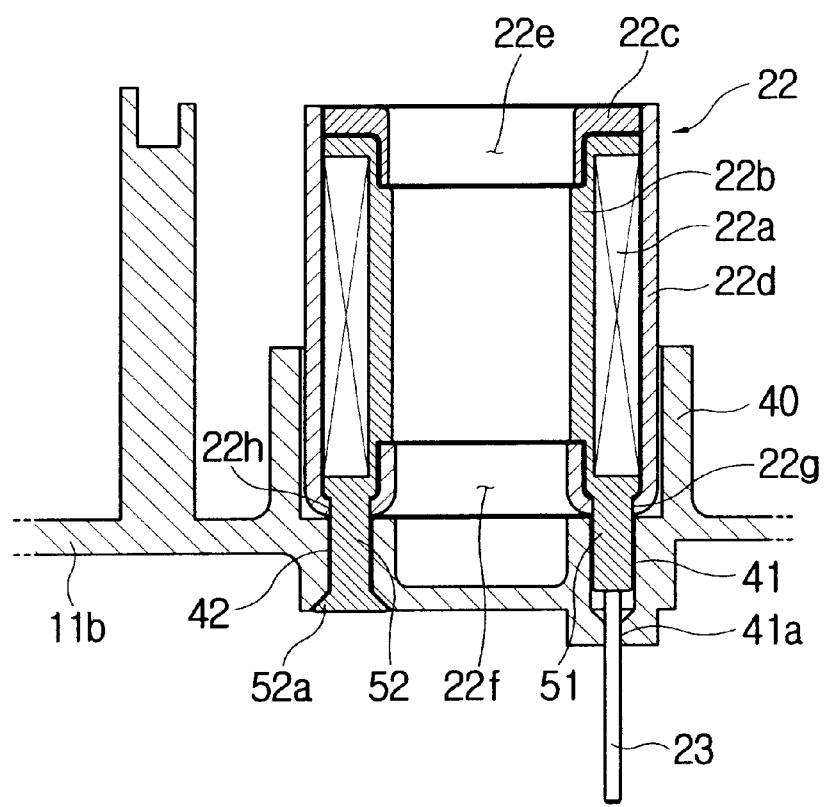

Thereafter, the lower end of the second boss 52, projecting outside the flared end 42a of the hole 42, is plastically deformed by heating said end of the boss 52 using an ultrasonic welding machine or through a staking process. Therefore, the lower end of the boss 52 is deformed into a countersunk stopper 52a, which has a profile corresponding to that of the flared end 42a of the hole 42 and is closely seated in the end 42a. Due to the countersunk stopper 52a closely seated in the flared end 42a, it is possible to securely mount the coil assembly 2 of the solenoid valve 20 on the bottom wall 11b of the ECU's housing 11 as shown in FIG. 6.

After the coil assemblies 22 of a desired number of solenoid valves 20 are set in the ECU's housing 11 through the above-mentioned process, the modulator block 30 is seated on the top of the housing 11 such that the sleeves 21a of the valve assemblies 21 are inserted into the coil assemblies 22, respectively. The modulator block 30 is, thereafter, securely assembled with the ECU's housing 11 by tightening the mounting bolts (not shown). The modulator block 30 is thus integrated with the ECU 10 into a single body.

As described above, the present invention provides a device for stably and securely mounting the coil assemblies of solenoid valves in the ECU's housing of an electronically controlled brake system. When mounting a coil assembly in the ECU's housing using the mounting device of this invention, the coil assembly is received in a cylindrical holder formed at the bottom wall of the ECU's housing. In such a case, two bosses formed on the bobbin of the coil assembly pass through two holes formed at the bottom wall of the ECU's housing, and one of the two bosses is plastically deformed at its lower end projecting outside an associated hole, thus forming a stopper preventing an undesired removal of the coil assembly from the housing. Due to the mounting device of this invention, it is possible to improve work efficiency while mounting the coil assemblies of solenoid valves in the ECU's housing, and so the production cost of the brake systems is reduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. In a solenoid valve for electronically controlled brake systems, comprising a valve assembly having an armature movably set in a sleeve;
   a coil assembly set in a housing of an electronic control unit of a brake system and having a bobbin axially receiving the sleeve of said valve assembly, with a coil wound around the bobbin;
   a lead wire inserted in said bobbin and connected to a circuit board set in said housing of the electronic control unit;
   and a device for mounting said coil assembly in the housing of the electronic control unit, said device comprising:
   a through hole formed in a bottom wall of said housing of the electronic control unit; and
   a boss axially extending downward from a bottom of said bobbin at a position around an edge of the bobbin, and inserted into said through hole to be set in said hole.

2. The device according to claim 1, wherein said boss passes through the through hole to be exposed outside the hole at an end thereof, and plastically deformed at the exposed end to form a stopper preventing an undesired removal of the coil assembly from the bottom wall of the housing.

3. The device according to claim 2, wherein a lower end of said through hole is gradually enlarged in a diameter thereof in a direction from the top to the bottom, thus forming a flared end allowing said stopper to be easily formed.

4. The device according to claim 1, wherein a cylindrical holder is formed in said housing, and receives the coil assembly therein, with said through hole formed on a bottom wall of said cylindrical holder.

5. The device according to claim 4, further comprising:

an additional boss axially extending downward from the bottom of said bobbin at a position around the edge of the bobbin, with said lead wire inserted into the additional boss; and a mounting hole formed on the bottom wall of said cylindrical holder, and receiving said additional boss therein.

* * * * *